United States Patent
Heuberger et al.

(10) Patent No.: US 9,905,984 B2
(45) Date of Patent: Feb. 27, 2018

(54) WINDSCREEN WIPER MOTOR AND CARBON HOLDER PLATE FOR A WINDSCREEN WIPER MOTOR

(71) Applicant: Valeo Wischersysteme GmbH, Bietigheim-Bissingen (DE)

(72) Inventors: Christof Heuberger, Freiberg (DE); Siegfried Stefani, Oberriexingen (DE); Werner Hartmann, Vaihingen/Enz (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 232 days.

(21) Appl. No.: 14/387,957

(22) PCT Filed: Mar. 28, 2013

(86) PCT No.: PCT/EP2013/056756
§ 371 (c)(1),
(2) Date: Sep. 25, 2014

(87) PCT Pub. No.: WO2013/144313
PCT Pub. Date: Oct. 3, 2013

(65) Prior Publication Data
US 2015/0035398 A1    Feb. 5, 2015

(30) Foreign Application Priority Data

Mar. 30, 2012 (DE) .................. 10 2012 102 810

(51) Int. Cl.
*H02K 13/00* (2006.01)
*H01R 39/38* (2006.01)
(Continued)

(52) U.S. Cl.
CPC .............. *H01R 39/383* (2013.01); *B60S 1/08* (2013.01); *H01R 4/242* (2013.01); *H01R 39/40* (2013.01); *H02K 11/026* (2013.01); *H02K 13/00* (2013.01)

(58) Field of Classification Search
CPC .... H02K 11/026; H02K 13/00; H01R 39/383; H01R 39/40
See application file for complete search history.

(56) References Cited

U.S. PATENT DOCUMENTS 3,967,148 A * 6/1976 Walsh ................... H01R 39/40
                                                310/239
4,673,834 A * 6/1987 Wrobel ................ H01R 4/2404
                                                310/71

(Continued)

FOREIGN PATENT DOCUMENTS

DE     27 01 161 A1    7/1978
DE     38 34 609 A1    4/1990
(Continued)

OTHER PUBLICATIONS

International Search Report for corresponding International Application No. PCT/EP2013/056756, dated Jul. 2, 2013 (2 pages).
(Continued)

*Primary Examiner* — Dang Le
(74) *Attorney, Agent, or Firm* — Osha Liang LLP

(57) ABSTRACT

A windscreen wiper motor with a housing is disclosed. In the housing, an armature shaft with a commutator is arranged, which cooperates with carbon elements arranged in the region of a carbon holder plate in carbon holder elements, which carbon elements are connected via electrical connections, in the form of strands, in an electrically conducting manner with voltage supply lines. An electrical connection and a voltage supply line are in a fixed manner in their (Continued)

Figure 1:
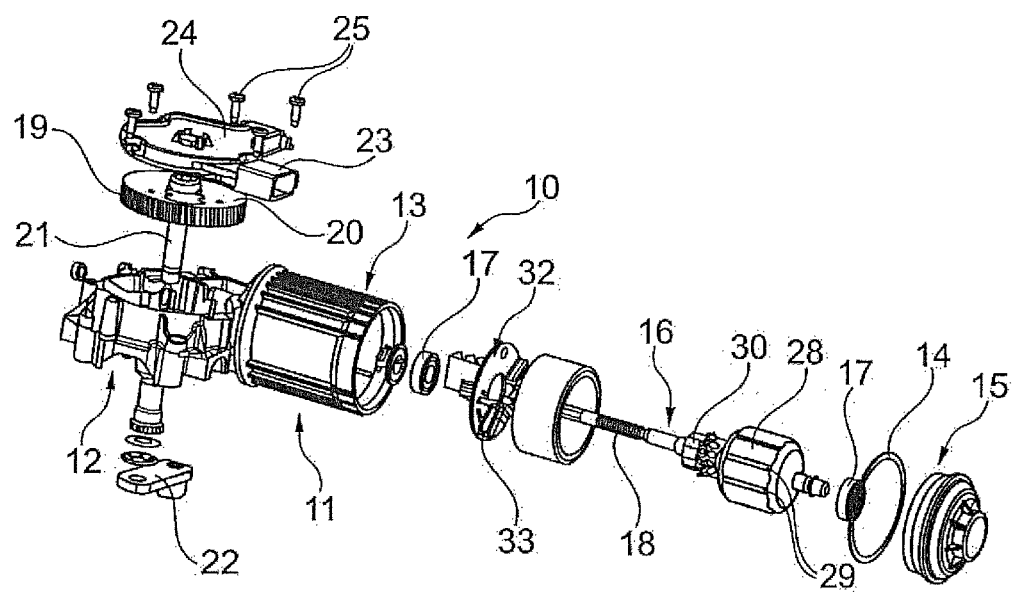

respective end region in respectively a clamping holder element, where the clamping holder element is part of the carbon holder element.

14 Claims, 3 Drawing Sheets

(51) Int. Cl.
*H01R 4/24* (2018.01)
*B60S 1/08* (2006.01)
*H01R 39/40* (2006.01)
*H02K 11/026* (2016.01)

(56) References Cited

U.S. PATENT DOCUMENTS

| | | | |
|---|---|---|---|
| 4,782,261 A * | 11/1988 | Crevling, Jr. | H02K 5/148 |
| | | | 310/242 |
| 5,621,262 A * | 4/1997 | Han | H01R 39/383 |
| | | | 310/239 |
| 5,644,182 A | 7/1997 | Rawls | |
| 5,689,148 A * | 11/1997 | Rubinchik | H02K 39/38 |
| | | | 310/239 |
| 6,975,059 B2 * | 12/2005 | Sakai | H01R 39/383 |
| | | | 310/239 |
| 7,336,008 B2 * | 2/2008 | Horioka | H02K 11/046 |
| | | | 310/68 D |
| 7,449,809 B2 | 11/2008 | Fritsch et al. | |

FOREIGN PATENT DOCUMENTS

| | | |
|---|---|---|
| DE | 39 36 672 A1 | 5/1990 |
| DE | 197 17 186 A1 | 10/1998 |
| DE | 10 2009 027 909 A1 | 1/2011 |
| EP | 0 638 968 A1 | 2/1995 |
| EP | 1 788 670 A1 | 5/2007 |
| JP | 2001-351759 A | 12/2001 |
| WO | 97/01878 A1 | 1/1997 |

OTHER PUBLICATIONS

Search Report for corresponding German Application No. 10 2012 102 810.9, dated Feb. 7, 2013 (2 pages).

* cited by examiner

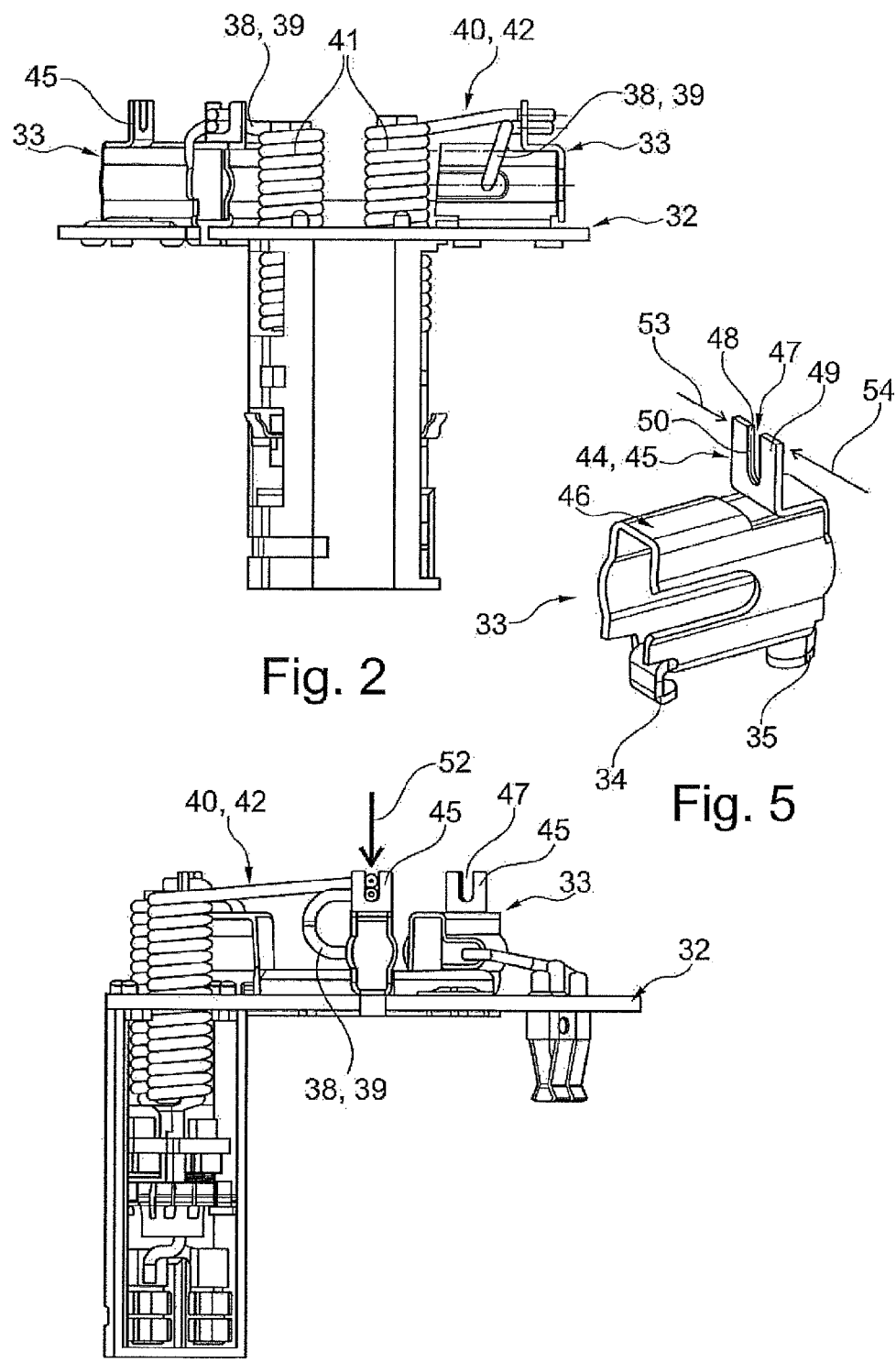

WINDSCREEN WIPER MOTOR AND CARBON HOLDER PLATE FOR A WINDSCREEN WIPER MOTOR

PRIOR ART

The invention relates to a windscreen wiper motor according to the preamble of claim 1. The invention also relates to a carbon holder plate for a windscreen wiper motor.

A windscreen wiper motor having the features of the preamble of claim 1 is already known from practice. In the said prior art, carbon elements are held in a carbon holder element, wherein the carbon elements press against the outer periphery of a commutator by means of the spring force of compression springs. The carbon elements are connected to voltage supply lines via connection strands. In this case, the voltage supply line is usually not directly connected to the strand but rather the voltage supply line is connected to the strand via a suppression device, in particular a suppression choke via the wire end of the suppression choke. The prior art discloses two methods for electrically connecting the strand to the voltage supply line or the wire end of the suppression choke: firstly, the two end regions (the strand and the suppression choke) are held in a copper sleeve which holds and fixes the connections by pressing. In this case, the copper sleeve is held and fixed in a through-opening of a carbon holder plate. A procedure of this kind for making electrical contact with the electrical connection and the carbon strands is relatively complicated since, in particular, additional components in the form of copper sleeves are required, these having to be mounted on the carbon holder plate. The advantage of this solution is that the corresponding end sections of the strands and the voltage supply lines assume a defined position which does not change over the service life of the windscreen wiper motor, in particular as the carbon elements wear and therefore the position of the strands correspondingly changes. Secondly, it is known to weld the carbon strands directly to the wire ends of the suppression chokes but otherwise to not fix them. A solution of this kind has the advantage that no additional components, as is the case when using copper sleeves, are required. However, it is disadvantageous in this case that the position of the connecting region between the electrical connections and the strands is not defined and changes over the service life of the windscreen wiper motor.

DISCLOSURE OF THE INVENTION

Proceeding from the described prior art, the invention is based on the object of developing a windscreen wiper motor according to the preamble of claim 1 in such a way that a defined position of the connecting region between the electrical connection lines and the strand (of the carbon elements), together with favourable production costs and a low space requirement, is possible over the service life of the windscreen wiper motor. According to the invention, this object is achieved in the case of a windscreen wiper motor having the features of claim 1 in that respectively an electrical connection and a voltage supply line are held in a fixed manner in their respective end region in respectively a clamping holder element, wherein the clamping holder element is part of the carbon holder element. In the case of an embodiment of this kind which protects the general concept of the invention, it is not necessary to connect the electrical connections and the voltage supply lines to one another, in particular by a welded connection. This is because the carbon holder element usually consists of sheet metal and is therefore electrically conductive and an electrical connection between the electrical connections and the voltage supply lines is ensured at least via the clamping holder elements.

Advantageous developments of the windscreen wiper motor according to the invention are specified in the dependent claims. All combinations of at least two features which are disclosed in the claims, the description and/or the figures are covered by the scope of the invention.

In a particularly preferred refinement of the clamping holder element, it is proposed that the clamping holder element has a receiving groove, open on one side, to receive the electrical connection and the voltage supply line. An embodiment of this kind of the clamping holder element with a receiving groove makes it possible to insert the electrical connection and the voltage supply line into the receiving groove, with the result that very simple, even automatic, mounting is possible.

It is very particularly preferred when the receiving groove is constructed on a clamping lug, bent off from the carbon holder element, arranged perpendicularly to the plane of the carbon holder plate. An arrangement of this kind of the receiving groove allows for particularly simple manual or automatic mounting of the electrical connections and the voltage supply lies by virtue of good accessibility to the receiving groove.

It is important for a reliable electrical and mechanical connection to be ensured, particularly when an additional welded connection between the electrical connection and the voltage supply line is dispensed with. It is therefore proposed in a further variant of the invention for the receiving groove to have cutting edges for the electrical connection and the voltage supply line in order to generate an insulation-displacement connection. Cutting edges of this kind also result in particularly reliable fixing of the electrical connection and the voltage supply line in the axial direction of the receiving groove.

In a structural alternative for forming a receiving groove in the clamping holder element, provision can be made for the clamping holder element to be constructed as a clamping lug which is formed parallel to a side wall of the carbon holder element, in particular to the upper face of the carbon holder element, and for a U-shaped receptacle to be formed between the side wall and the clamping lug. An embodiment of this kind allows for the clamping holder element to be constructed in a relatively simple manner in respect of production by a simple stamping process, wherein, for the purpose of inserting the electrical connection and the voltage supply line, the receptacle is initially of a size which allows for the insertion of the two elements with a low level of play.

It is particularly preferred in the last-mentioned variant when the clamping lug is deformed in the direction of the side wall of the carbon holder element by a pressing force being applied in order to form a clamping connection between the clamping holder element and the electrical connection and the voltage supply line. This allows the lines to be fixed in the receptacle, this fixing process possibly not requiring any (additional) welding between the electrical connection and the voltage supply line.

However, a refinement in which the electrical connections and the voltage supply lines are connected with one another in the region of the clamping holder element by a welded connection, preferably a spot-welded connection, is highly preferred. This results in a direct electrical connection between the electrical connection in question and the voltage supply line independently of electrical contact being made with the electrical connections and the voltage supply line via the clamping holder element.

It may be advantageous in respect of production and mounting when the welded connection is arranged outside the receiving region for the electrical connection and the voltage supply line in the clamping holder element. In particular, any geometric inaccuracies, caused by the welded connection, which may be present are remedied in this case. This can also result in a production order in the case of which first the electrical connection and the voltage supply line are positioned in the receiving region of the clamping holder element, and then welding takes place.

However, provision may also be made for the welded connection to be arranged inside the receiving region for the electrical connection and the voltage supply line in the clamping holder element. In this case, welding is performed after the parts are inserted into or placed on the clamping holder element, or else by a preceding welding process.

The invention also comprises a carbon holder plate for a windscreen wiper motor, which carbon holder plate has carbon holder elements for receiving carbon elements and clamping holder elements for the fixing of electrical connections, preferably in the form of carbon strands, and voltage supply lines.

Further advantages, features and details of the invention can be found in the following description of preferred exemplary embodiments and with reference to the drawings.

Figure 3:
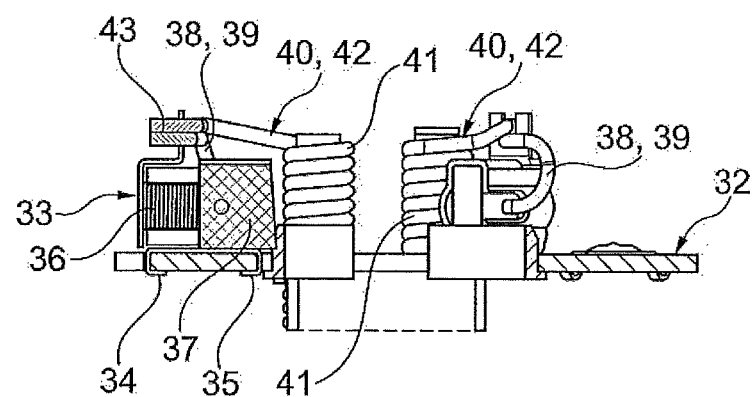

In said drawings:

FIG. 1 shows an exploded illustration of the important parts of a windscreen wiper motor according to the invention, FIG. 2 shows a side view of a carbon holder plate, as is used in the windscreen wiper motor according to FIG. 1, FIG. 3 shows a partially sectioned illustration of the upper part of the carbon holder plate according to FIG. 2, FIG. 4 shows a further, partially sectioned illustration of the carbon holder plate according to FIG. 2, FIG. 5 shows a perspective detailed illustration of a carbon holder plate, as is used in a carbon holder plate according to FIGS. 2 to 4, and FIG. 6 shows a side view of a carbon holder plate which is modified in relation to FIG. 2.

Identical components or components with the same function are provided with the same reference numerals in the figures.

The important constituent parts of a windscreen wiper motor 10 according to the invention are illustrated in FIG. 1. The windscreen wiper motor 10 comprises a housing 11 which has a gear mechanism housing region 12 and a motor housing region 13, these housing regions being connected to one another, by way of example, in an integral manner. The motor housing region 13 can be closed by means of a motor housing cover 15, with the interposition of a sealing ring 14, on that side which is opposite the gear mechanism housing 12. It goes without saying that other housing constructions can be provided for the windscreen wiper motor 10 within the scope of the invention since the housing construction is not essential to the invention.

An armature shaft 16 is mounted such that it can be rotated in several bearings 17 inside the housing 11 of the windscreen wiper motor 10. That end of the armature shaft 16 which faces the gear mechanism housing region 12 has a worm tooth system 18 which meshes with a radial tooth system 19 of a gear wheel 20. The gear wheel 20 is connected to an axle 21 in a rotationally fixed manner and the end of the axle 21 cooperates with a lever 22 which is coupled, in particular, to a wiper rod of a windscreen wiper apparatus. On that side of the gear mechanism housing region 12 which is opposite the lever 22, the gear mechanism housing region 12 is closed by means of a gear mechanism housing cover 24, which is at the same time fitted with the electrical connection region 23 for the windscreen wiper motor 10, using screws 25.

The armature shaft 16 is fitted in the customary manner with a laminated armature core 28 with groove-like clearances, which run in the longitudinal direction of the armature shaft 16, for receiving wire windings 29. The wire windings 29 are, likewise in a known manner, electrically connected to a commutator 30 which is likewise arranged on the armature shaft 16 in a rotationally fixed manner.

A carbon holder plate 32 is also arranged inside the housing 11 in a stationary manner. In order to produce two different speed wiping stages, the carbon holder plate 32, which preferably consists of pertinax, has three carbon holder elements 33 which are of identical construction and one carbon holder element 33 of which is illustrated in detail in FIG. 5. As shown by looking at, in particular, FIGS. 2, 3 and 5 together, the carbon holder element 33 which consists of sheet metal and is constructed as a stamped bent part has two strip-like holding feet 34, 35 on that side which faces the carbon holder plate 32, the said holding feet being routed through corresponding through-openings in the carbon holder plate 32 and being bent towards the lower face of the carbon holder plate 32, with the result that the carbon holder elements 33 are fixedly connected to the carbon holder plate 32. A compression spring 36 (see FIG. 3) which presses against an end face of a carbon element 37 is arranged inside each carbon element 33 in a manner which is known per se. The carbon element 37, for its part, bears against the commutator 30 by way of its end face, which is opposite the compression spring 36, under the spring force of the compression spring 36.

The carbon element 37 is electrically connected to an electrical connection 38, in particular in the form of a strand 39. The strand 39 is, for its part, electrically contact-connected to a voltage supply line 40 which ultimately issues into a connection pin in the connection region 23. In order to suppress electrical interference in the electrical voltage supply line 40, the said voltage supply line has, on that side which faces the strand 39, an electrical suppression choke 41 with a choke wire 42. That end region of the choke wire 42 which faces the strand 39 is preferably connected to the corresponding end of the strand 39 by a spot-welded connection 43.

The carbon holder element 33 is particularly designed in order to ensure that the electrical connection region between the strand 39 in the connection region to the choke wire 42 is arranged at (the same) defined point within the housing 11 or in the region of the carbon holder plate 32 over the entire service life of the windscreen wiper motor 10 during which the carbon elements 37 move in the direction of the commutator 30 and thereby cause the strand 39 to move. In this respect, reference will first be made to FIG. 5: the said figure shows that a clamping holder element 44 in the form of a clamping lug 45 is bent out of an upper wall section on the upper face of the carbon holder element 33, which upper face is opposite the holding feet 34, 35. In particular, the clamping lug 45 is bent through 90° in relation to the upper face 46 of the carbon holding element 33, with the result that the clamping lug 45 runs perpendicular to the carbon holder plate 32 or to the longitudinal axis of the armature shaft 16. A receiving groove 47 which is open on one side is formed in the clamping lug 45, in particular by means of a stamping process. Provision can additionally be made, in particular on the two opposite side faces 48, 49 of the receiving groove 47, for the said side faces to have cutting edges 50, only one cutting edge 50 thereof in the region of one side face 48 being shown in FIG. 5 on account of the perspective view. The cutting edges 50 can be formed in a customary manner, in particular by means of an embossing process.

The receiving groove 47 serves to receive the ends of the strand 39 and of the choke wire 42, which ends are connected to one another, in a clamping manner. To this end, the corresponding choke wire 42 is inserted or pressed into the receiving groove 47 together with the corresponding end of the strand 39 as shown in FIGS. 2 to 4. If cutting edges 50 are provided inside the receiving groove 47, the distance between the side faces 48, 49 is smaller than the corresponding diameter of the strand 39 or of the choke wire 42, with the result that, by being pushed in the direction of arrow 52 (FIG. 4), the strand 39 and the choke wire 42 become embedded in the side faces 48, 49 and are held there by means of the insulation-displacement connection. However, provision is preferably made for the width of the receiving groove 47 to be selected in such a way that the said width of the receiving groove is somewhat larger than the diameter of the strand 39 of the choke wire 42. Insertion or pushing into the receiving groove 47 is additionally made easier in this case. In a last step, the two free ends of the clamping lug 45 can be pressed against one another in accordance with arrows 53, 54 (FIG. 5) in order to establish a close connection between the clamping lug 49 and the strand 39 and also the choke wire 42 and to hold it securely in the receiving groove 47.

If a spot-welded connection 43 is formed between the strand 39 and the choke wire 42, it may be advantageous for the spot-welded connection 43 to be located outside the region of the receiving groove 47. This ensures, in particular, that the geometry (diameter) of the strand 39 and of the choke wire 42 in the region of the receiving groove 47 is influenced slightly, with the result that the tolerance or the width b at the receiving groove 47 is relatively uncritical.

Figure 6:
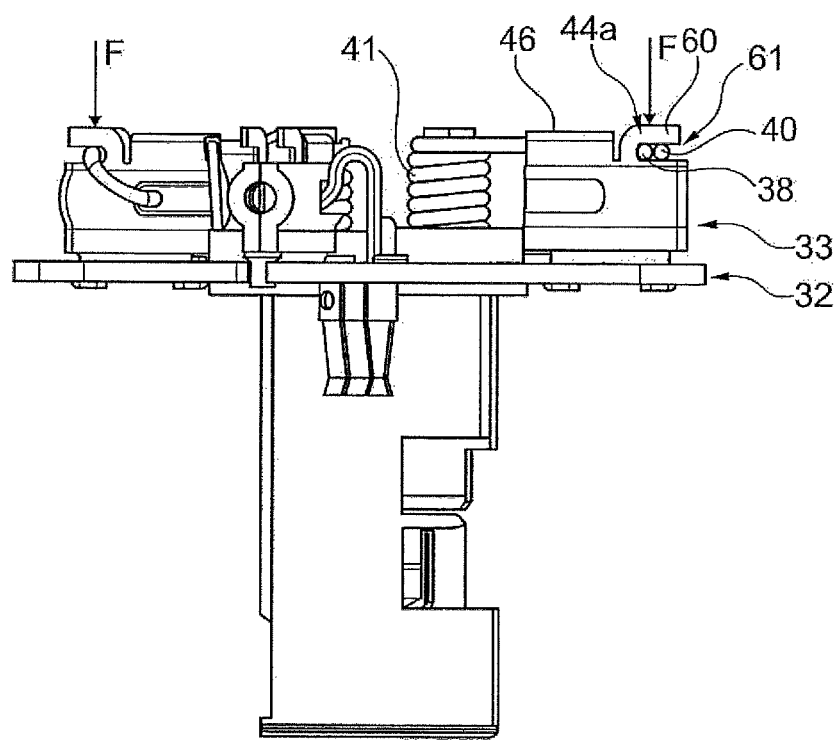

In the exemplary embodiment of the invention illustrated in FIG. 6, the clamping holder element 44a is constructed as a clamping lug 60 which is constructed parallel to a side wall of the carbon holder element 33, in particular to the upper face 46 of the carbon holder element 33. A U-shaped receptacle 61 for receiving the electrical connection 38 and the voltage supply line 40 is formed between the clamping lug 60, which is generated by a stamping process, and the side wall of the carbon holder element 33. After the electrical connection 38 and the voltage supply line 40 are inserted into the receptacle 61, the clamping lug 60 is deformed in the direction of the carbon holder element 33 by a pressing force F being applied in order to form a clamping connection between the clamping lug 60 and the electrical connection 38 and the voltage supply line 40.

The windscreen wiper motor 10 which has been described up to this point can be altered or modified in various ways without departing from the concept of the invention. The said concept of the invention involves receiving the ends of the strands 39 and of the electrical voltage supply lines 40 in the form of the choke wires 42 in a defined manner in the region of the carbon holder elements 33 via a clamping connection, with the result that the connecting region is always arranged at the same point inside the housing 11 over the service life of the windscreen wiper motor 10 or of the carbon elements 37.

REFERENCE SYMBOLS

10 Windscreen wiper motor
11 Housing
12 Gear mechanism housing region
13 Motor housing region
14 Sealing ring
15 Motor housing cover
16 Armature shaft
17 Bearing
18 Worm tooth system
19 Radial tooth system
20 Gear wheel
21 Axle
22 Lever
23 Connection region
24 Gear mechanism housing cover
25 Screw
28 Laminated armature core
29 Wire winding
30 Commutator
32 Carbon holder plate
33 Carbon holder element
34 Holding foot
35 Holding foot
36 Compression spring
37 Carbon element
38 Electrical connection
39 Strand
40 Voltage supply line
41 Suppression choke
42 Choke wire
43 Spot-welded connection
44;a Clamping holder element
45 Clamping lug
46 Upper face
47 Receiving groove
48 Side face
49 Side face
50 Cutting edge
52 Arrow
53 Arrow
54 Arrow
60 Clamping lug
61 Receptacle

The invention claimed is:

1. A windscreen wiper motor, comprising:
a housing, wherein in the housing an armature shaft with a commutator is arranged, which cooperates with carbon elements arranged in a region of a carbon holder plate in carbon holder elements,
wherein the carbon elements are connected via electrical connections in the form of strands, in an electrically conducting manner with voltage supply lines,
wherein an electrical connection of the electrical connections and a voltage supply line of the voltage supply lines are held in a fixed manner in their respective end region in a clamping holder element,
wherein the clamping holder element is part of a carbon holder element of the carbon holder elements,
wherein the clamping holder element has a conductive receiving groove, open on one side, to receive and electrically connect the electrical connection and the voltage supply line, and
wherein the electrical connection and the voltage supply line are both pushed in the same clamping holder element and both become embedded in cutting edges of the receiving groove of the clamping holder element by insulation-displacement connection.

2. The windscreen wiper motor according to claim 1, wherein the carbon holder element consists of sheet metal and is constructed as a stamped bent part.

3. The windscreen wiper motor according to claim 2, wherein the clamping holder element is constructed as a clamping lug which is formed parallel to a side wall of the carbon holder element to the upper face of the carbon holder element, and wherein a U-shaped receptacle is formed between the side wall and the clamping lug.

4. The windscreen wiper motor according to claim 3, wherein the clamping lug is deformed in the direction of the side wall of the carbon holder element by a pressing force being applied in order to form a clamping connection between the clamping holder element and the electrical connection and the voltage supply line.

5. The windscreen wiper motor according to claim 1, wherein the receiving groove is constructed on a clamping lug, bent off from the carbon holder element, arranged perpendicularly to the plane of the carbon holder plate.

6. The windscreen wiper motor according to claim 1, wherein the electrical connection and the voltage supply line are connected with one another in the region of the clamping holder element by a spot-welded connection.

7. The windscreen wiper motor according to claim 6, wherein the welded connection is arranged outside the receiving region for the electrical connection and the voltage supply line in the clamping holder element.

8. The windscreen wiper motor according to claim 6, wherein the welded connection is arranged inside the receiving region for the electrical connection and the voltage supply line in the clamping holder element.

9. The windscreen wiper motor according to claim 1, wherein the voltage supply line embraces a choke wire of a suppression choke.

10. The windscreen wiper motor according to claim 1, wherein the carbon holder element has holding feet which project through through-openings of the carbon holder plate, which consists of pertinax, and are bent around towards the underside thereof.

11. The windscreen wiper motor according to claim 1, wherein the cutting edges are formed by an embossing process.

12. The windscreen wiper motor according to claim 1, wherein the receiving groove is substantially flat.

13. A carbon holder plate for a windscreen wiper motor, comprising:
    carbon holder elements for receiving carbon elements; and
    clamping holder elements for the fixing of electrical connections, in the form of carbon strands, and voltage supply lines,
    wherein the clamping holder elements have conductive receiving grooves, open on one side, to receive and electrically connect the electrical connections and the voltage supply lines, and
    wherein the electrical connection and the voltage supply line are both pushed in the same clamping holder element and both become embedded in cutting edges of the receiving groove of the clamping holder element by insulation-displacement connection.

14. A carbon holder element for receiving a carbon element, comprising:
    an upper face; and
    a clamping holder element comprising a clamping lug located above the upper face and oriented perpendicular to a carbon holder plate,
    wherein the clamping lug comprises a receiving groove open on one side to receive and electrically connect electrical connections and voltage supply lines, and
    wherein the electrical connections and the voltage supply lines are both pushed in the same receiving groove to both become embedded in cutting edges of the receiving groove by insulation-displacement connection.

* * * * *